United States Patent
Schlesiger et al.

(10) Patent No.: US 7,259,257 B2
(45) Date of Patent: *Aug. 21, 2007

(54) PROCESS FOR PRODUCING PARTICULATE, WATER-SOLUBLE CELLULOSE DERIVATIVES USING A SUPERHEATED GAS MIXTURE CONTAINING STEAM

(75) Inventors: Hartwig Schlesiger, Fallingbostel (DE); Martin Morning, Bomlitz (DE); Gunter Weber, Fallingbostel (DE); Volker Eckhardt, Walsrode (DE); Gerd Sonnenberg, Walsrode (DE); René Kiesewetter, Fallingbostel (DE)

(73) Assignee: Wolff Walsrode AG, Walsrode (DE)

( * ) Notice: Subject to any disclaimer, the term of this patent is extended or adjusted under 35 U.S.C. 154(b) by 1142 days.

This patent is subject to a terminal disclaimer.

(21) Appl. No.: 09/785,905

(22) Filed: Feb. 16, 2001

(65) Prior Publication Data

US 2001/0025101 A1 Sep. 27, 2001

(30) Foreign Application Priority Data

Feb. 28, 2000 (DE) ............................... 100 09 411

(51) Int. Cl.
*C08B 11/20* (2006.01)
(52) U.S. Cl. ....................... 536/128; 536/127
(58) Field of Classification Search ................ 536/86, 536/90, 91, 95–98, 127, 128; 241/21, 23, 241/24.1
See application file for complete search history.

(56) References Cited

U.S. PATENT DOCUMENTS 4,399,522 A   8/1983   Kotecha
4,747,550 A   5/1988   Jäckering
4,820,813 A   4/1989   Schulz
4,979,681 A   12/1990  Dënges et al.
5,845,855 A   12/1998  Yamada et al.

FOREIGN PATENT DOCUMENTS

| DE | 3811910 | | 4/1997 |
| EP | 0 835 881 | | 4/1998 |
| GB | 2262527 | | 6/1993 |
| GB | 2262527 A | * | 6/1993 |
| WO | 98/31710 | | 7/1998 |

OTHER PUBLICATIONS

Translation of WO 98/31710.*

* cited by examiner

*Primary Examiner*—Leigh C. Maier
(74) *Attorney, Agent, or Firm*—Connolly Bove Lodge & Hutz LLP

(57) ABSTRACT

The present invention relates to a new, particularly economical process for preparing particulate water-soluble cellulose derivatives. The process involves forming a feed composition of swollen and/or dissolved cellulose derivative, and water. The feed composition is contacted with a superheated gas mixture, in a sieve-free high rotational speed gas jet impact mill, and the cellulose derivative of the feed composition is converted into a solid state form of finely particulate particles. The superheated gas mixture, with which the feed composition is contacted, is selected from: (i) a superheated gaseous mixture of steam and an inert gas; and (ii) a superheated gas mixture of steam and air. The superheated gas mixture has a steam content of 40 wt. % to 99 wt. %, based on the total weight of the superheated gas mixture.

8 Claims, No Drawings

PROCESS FOR PRODUCING PARTICULATE, WATER-SOLUBLE CELLULOSE DERIVATIVES USING A SUPERHEATED GAS MIXTURE CONTAINING STEAM

FIELD OF THE INVENTION

The present invention relates to a new, particularly economical process for the production of particulate water-soluble cellulose derivatives, preferably those with a thermal flocculation point.

BACKGROUND OF THE INVENTION

After the reaction and optionally after removing the byproducts formed in the reaction, cellulose derivatives, in particular cellulose ethers, are present in friable, particulate or wad-like form. In this form the cellulose derivatives still have the structures predetermined by the raw materials. Thus for example cellulose ethers generally still exhibit the fibre-like structure of the initial cellulose. These cellulose derivatives are thus unsuitable for their intended use, for example as products soluble in organic and/or aqueous media.

It is also necessary to adjust specific grain size distributions, bulk densities, degree of dryness and viscosity values for the various areas of use.

In principle almost all cellulose derivatives therefore have to be compacted, ground and dried in order to make them fit for use.

The industrially important cellulose derivatives include in particular the cellulose ethers, whose production, properties and applications are scribed for example in: Ullmann's Encyclopaedia of Industrial Chemistry, $5^{th}$ Edition (1986), Volume A5, pages 461-488, VCH Verlagsgesellschaft, Weinheim; and Methoden der organischen Chemie (Methods of Organic Chemistry), 4th Edition (1987), Volume E20, Makromolekulare Stoffe, (Macromolecular Substances) Part-Volume 3, pages 2048-2076, Georg Thieme Verlag Stuttgart.

EP-A 0 049 815 describes a two-stage process for the production of micronised powders of cellulose ethers or cellulose, in which the products, which have a fine fibrous or woolly structure, are first of all converted into a brittle solidified form, and the thus treated material is subjected to a grinding operation until a grain size distribution of at least 90% below 0.125 mm is achieved. Vibratory mills or ball mills, preferably cooled, or pellet presses are used in the embrittlement stage, and jet mills, pinned disc mills or impact disc mills are used in the grinding stage.

EP-A-0 370 447 describes a process for the gentle grinding and simultaneous drying of moist cellulose ethers, in which a cellulose ether having an initial moisture content of 20 to 70 wt. % is conveyed by means of a carrier gas and at the same time is friction comminuted to an impact comminution size and is dried by the grinding energy to a residual moisture content of 1 to 10 wt. %.

EP-A-0 384 046 describes a process for the production of cellulose ether particles, comprising the comminution in a high rotational speed, air jet rotary impact mill to a particle size of 0.4 to 0.035 mm of cellulose ethers with a viscosity of greater than 100 Pa*s, measured as a 2% aqueous solution at 20° C. using an Ubbelohde tube.

EP-A-0 835 881 describes a process for the production of methyl cellulose powders with a special particle-size distribution curve by adjusting a methylhydroxyalkyl cellulose granular material to a moisture content of 30 to 70 wt. % with water, followed by grinding in a rotary mill, the product being simultaneously dried by the imparted grinding energy. A special particle-size distribution curve is established by size classification.

The known process according to the prior art are for the most part multi-stage processes involving a preliminary drier or preliminary embrittlement and/or compaction. Furthermore, in all the known processes the chemical and/or thermal stress on the macromolecules, particularly when processing extremely viscous, highly substituted products, is always also so intense that during the grinding the macromolecules are decomposed in the form of a chain scission, which is noticeable in particular by the more or less large decrease in viscosity compared to the starting products. Also the surfaces of the products treated by the preliminary embrittlement and/or preliminary drying steps become rough. Furthermore, a common feature of all the processes is the large amount of energy expended in grinding the cellulose derivatives after the preliminary drying, embrittlement or compaction.

Processes are already known that avoid one or more of the aforementioned disadvantages. For example, GB-A-2 262 527 describes a process for the comminution of cellulose derivatives by gelling a cellulose ether with a water content of 30 to 80 wt. % by cooling to a temperature of −10° to 60° C. followed by mill drying of the gel (preferably in an impact mill). In this process however air or nitrogen is used for the drying and conveying, which is then not recycled. The energy expended in carrying out the process is thus considerably higher than is theoretically necessary for evaporating the water contained in the ground material. Also, GB-A-2 262 527 does not give any indication of how to proceed with hydroxyethylated mixed ethers of methyl cellulose (such as for example methylhydroxyethyl cellulose or methylhydroxypropylhydroxyethyl cellulose) in order to obtain a product having a bulk density of greater than 300 g/l. The end product of the mill drying of methyl cellulose (Example 3) with a bulk density of 270 g/l is also not satisfactory.

WO 98/31710 describes a process for the production of finely particulate poly-saccharide derivatives by gelling or dissolving a cellulose ether with 35 to 99 wt. % (preferably 60 to 80 wt. %) of water referred to the total weight, followed by mill drying, wherein superheated steam is used to transport and dry the ground material. This process likewise avoids many of the aforementioned disadvantages. However, the comminution in this mill drying process is still not sufficient, and only 57 wt. % of the comminuted methylhydroxyethyl cellulose passes through a 0.063 mm sieve (Example 3). The desired fineness is achieved only by a size classification by means of an air jet sieve. Moreover the use of pure steam as carrier gas and heat exchange gas has disadvantages as regards the operational safety of the grinding plant since films and encrustations quickly form due to condensation of water together with the finely particulate polysaccharide derivative. The expenditure on maintenance measures is thus increased. Finely particulate products that pass in an amount of more than 95 wt. % through a 0.1 mm sieve or even in an amount of more than 90 wt. % through a 0.063 mm sieve are obtained according to this application only by dispersing dissolved polysaccharide derivatives in a non-dissolving ambient medium, followed by comminution, filtration and drying steps (Examples 1 and 2).

The object of the present invention is accordingly to provide a process for the production of particulate water-soluble cellulose derivatives, in which:

specific grinding levels can be set;
the surface of the products does not become rough; and
the bulk density of the products is increased.

SUMMARY OF THE INVENTION

In accordance with the present invention, there is provided a process for producing particulate water-soluble cellulose derivatives, comprising:
a) forming a feed composition comprising a cellulose derivative (e.g., being present in an amount of 20 wt. % to 50 wt. %, based on the total weight of the feed composition) and 50 wt. % to 80 wt. % of water, based on the total weight of the feed composition, wherein the cellulose derivative is at least one of swelled and dissolved in the feed composition;
b) contacting, in a high rotational speed gas jet impact mill, the feed composition with a superheated gas mixture selected from (i) a superheated gaseous mixture of steam and an inert gas, and (ii) a superheated gas mixture of steam and air, (thus converting at least a portion of the water of the feed composition into the vapor phase), thereby converting the cellulose derivative of the feed composition into a solid state form of finely particulate particles, wherein the superheated gas mixture has a steam content of 40 wt. % to 99 wt. %, based on the total weight of the superheated gas mixture;
c) separating the particulate cellulose derivative from the superheated gas mixture; and
d) optionally drying the particulate cellulose derivative.

Other than in the operating examples, or where otherwise indicated, all numbers expressing quantities of ingredients, reaction conditions, etc. used in the specification and claims are to be under stood as modified in all instance by the term "about." As used in the specification and in the claims, the symbol "<" means "less than," and the symbol ">" means "greater than."

DETAILED DESCRIPTION OF THE INVENTION

It has been found that the cellulose derivative solid particles produced using the process of the present invention have a high bulk density combined with a good flowability, and the proportion of fines in the product is very low. There is no decrease or only a minimal decrease in viscosity compared to the starting products. It was also found that the overall energy requirement of the process is reduced or virtually unchanged compared to the processes of the prior art, and since the heat exchange gas consists of a superheated steam/inert gas mixture or steam/air mixture, the energy used for the grinding is recovered, in the form of thermal energy, in the heat exchange gas and can thus be utilized or preferably converted into other forms of energy. It was also surprisingly found that no films or agglomerations are formed in the grinding plant and the maintenance expenditure is thus low.

The process according to the invention is a new, particularly economical process for the production of particulate water-soluble cellulose derivatives. The process comprises the swelling and/or dissolution of the cellulose derivative in water to form the feed composition, and the subsequent mill drying of the feed composition in a preferably sieve-free high rotational speed gas jet impact mill. A steam/inert gas mixture or steam/air mixture is used as carrier gas and heat exchange gas, and contacts the feed composition in the mill.

The cellulose derivatives that are used in this process are soluble or at least swellable in water. They may contain one or more substituents of the type: hydroxyethyl, hydroxypropyl, hydroxybutyl, methyl, ethyl, propyl, dihydroxy-propyl, carboxymethyl, sulfoethyl, hydrophobic long-chain branched and unbranched alkyl radicals, hydrophobic long-chain branched and unbranched alkylaryl radicals or arylalkyl radicals, cationic radicals, acetate, propionate, butyrate, lactate, nitrate, and sulfate. Some of these recited radicals, such as for example hydroxyethyl, hydroxypropyl, hydroxybutyl, dihydroxypropyl and lactacte are able to form grafts, and the substituents of the polysaccharide derivatives according to the invention are not restricted to the aforementioned radicals.

Examples of cellulose derivatives are hydroxyethyl cellulose (HEC), hydroxypropyl cellulose (HPC), ethylhydroxyethyl cellulose (EHEC), carboxymethylhydroxyethyl cellulose (CMHEC), hydroxypropyl-hydroxyethyl cellulose (HPHEC), methyl cellulose (MC), methylhydroxypropyl cellulose (MHPC), methylhydroxy-propyl-hydroxyethyl cellulose (MHPHEC), methylhydroxyethyl cellulose (MHEC), carboxymethyl cellulose (CMC), hydrophobically modified hydroxyethyl cellulose (hmHEC), hydrophobically modified hydroxypropyl cellulose (hmHPC), hydrophobically modified ethylhydroxyethyl cellulose (hmEHEC), hydrophobically modified carboxymethylhydroxyethyl cellulose (hmCMHEC), hydrophobically modified hydroxypropylethylhydroxyethyl cellulose (hmHPHEC), hydrophobically modified methyl cellulose (hmMC), hydrophobically modified methylhydroxypropyl cellulose (hmMHPC), hydrophobically modified methylhydroxyethyl cellulose (hmMHEC), hydrophobically modified carboxymethylmethyl cellulose (hmCMMC), sulfoethyl cellulose (SEC), hydroxyethylsulfoethyl cellulose (HESEC), hydroxypropylsulfoethyl cellulose (HPSEC), methylhydroxyethylsulfoethyl cellulose (MHESEC), methylhydroxypropylsulfoethyl cellulose (MHPSEC), hydroxyethylhydroxypropylsulfoethyl cellulose (HE-HPSEC), carboxymethylsulfoethyl cellulose (CMSEC), hydrophobically modified sulfoethyl cellulose (hmSEC), hydrophobically modified hydroxyethylsulfoethyl cellulose (hmHESEC), hydrophobically modified hydroxypropylsulfoethyl cellulose (hmHPSEC), and hydrophobically modified hydroxyethylhydroxypropylsulfoethyl cellulose (hm-HEHPSEC), Particularly preferred cellulose derivatives are cellulose ethers with a thermal flocculation point in water, such as for example methyl cellulose, methylhydroxyethyl cellulose, methylhydroxypropyl cellulose, methylhydroxy-propylhydroxyethyl cellulose and hydroxypropyl cellulose.

The amount of alky substituents are usually descripted by the "DS". DS is the averge amount of OH-radicals which is substituted in the glucose unit. The substitution of methyl is descripted by the term "DS (M)". The substitution of hydroxyalkyl is descripted by the term "MS". This is the average amount of mols of the etherification agent bounded to the glucose unit. The substitution of ethylene oxide is descripted by the term "MS (ME)". The substitution of propylene oxide is descripted by the term "MS (HP)".

The value of DS(M), MS (HE) and MS (HP) is determined by the method of Zeisel p.e. according to G. Bartelmus, R. Kellerer, Z. Anal. Chem. 286 (1977), 161-190.

Most preferred are methylhydroxyethyl celluloses with a DS (M) of 1 to 2.6 and a MS (HE) of 0.05 to 0.9, in particular those with a DS (M) of 1.3 to 1.9 and a MS (HE) of 0.15 to 0.55, and methylhydroxypropylhydroxyethyl celluloses with a DS (M) of 1 to 2.6 and a MS (HP) of 0.05 to 1.2 and a MS (HE) of 0.05 to 0.9, in particular those with a DS (M) of 1.3 to 1.9 and a MS (HP) of 0.05 to 0.6 and a MS (HE) of 0.15 to 0.55.

The water solubility of those cellulose derivatives having a thermal flocculation point in water is highly temperature dependent. Below the thermal flocculation point these cellulose derivatives form solutions and/or gels. The thermal flocculation point in water describes the temperature at which the cellulose derivative undergoes heat coagulation.

Predominant structures resulting from the cellulose starting material are destroyed by the swelling and/or dissolution process. Thus for example in the case of cellulose ethers the fibre-like structure is almost completely lost, and only the fraction of the cellulose ether whose derivatisation is sufficient is swollen or dissolved. The swollen and/or dissolved cellulose derivatives of the feed composition contain less than 25 to 50 wt. %, based on the solids fraction, of soluble and/or swellable material in the initial state.

The feed composition, containing swollen and/or dissolved cellulose derivatives, constitutes a viscoelastic system whose general properties correspond, according to the amount of solvent and cellulose derivative, to a solution that can flow under its own weight, a flexible gel, or a soft but brittle solid.

The amount of water used to prepare the feed composition is chosen so as to achieve a sufficient swelling and/or dissolution, in order to destroy the fibre structures of the cellulose derivative. In a preferred procedure the amount of water in the feed composition is 50 to 80 wt. %, preferably 65 to 78 wt. %, in particular 68 to 76 wt. %, based on the total weight of the feed composition. It has surprisingly been found that a minimum specific water content is necessary in order to achieve a desired bulk density of the ground product. This value varies, inter alia, with the nature of the substituents, the degree of etherification and the molecular weight of the cellulose derivative. In general a higher esterification requires a lower water content. Also, in general a low molecular weight requires a low water content. Exceptions are however also found. It is recommended that in each case the optimum water content for the cellulose derivative to be processed be determined by preliminary tests.

In a modification of the process, in step a) cellulose ethers having a thermal flocculation point in water, preferably methyl cellulose, methylhydroxyethyl cellulose, methylhydroxypropyl cellulose, methylhydroxypropylhydroxyethyl cellulose, hydroxypropyl cellulose, are swollen and/or dissolved by cooling to temperatures below the flocculation point so that predominant structures, e.g. fibre structures, are largely destroyed. The cellulose ethers (used to prepare the feed composition) are preferably used in the form of a water-moist filter cake. Water-moist filter cakes of methylhydroxyethyl cellulose, methylhydroxypropyl cellulose, methylhydroxypropylhydroxyethyl cellulose or methyl cellulose with normally ca. 40 to 65 wt. % of water are particularly preferably used, to which additional water is added and which are then cooled. Cold water is preferably mixed in and the whole is then homogenized in a manner known to those of ordinary skill in the art. Thus for example water is continuously mixed in a twin-screw compounder and the mixture is then homogenized by applying shear forces and compounding. Co-rotating as well as counter-rotating machines are suitable, the co-rotating machines being preferred on account of the axial open access. The screw configuration must be adapted to the imposed conditions so as to achieve a sufficient compounding effect, while on the other hand the shear force must be suitably adjusted so that the material is not subjected to any unallowable stress, which could possibly lead to a decrease in the molecular chain length. So-called divided trough kneaders with two horizontally arranged agitator blades that engage deeply with one another and that perform a mutual stripping action, as in the case of twin-screw compounders, are characterized by a comparatively small shear gradient (manufacturers IKA, List). By varying the rotational speed of the screws the required friction is generated in the kneaded cellulose derivative material and a good dispersion and homogenization of the methyl cellulose with water is thereby achieved.

Single-shaft, continuous compounders suitable for the homogenization include the so-called Reflector® range, which are high performance mixers of modular construction, consisting of a multi-part, heatable and coolable mixing cylinder and a unilaterally mounted blade mixer (manufacturer: Lipp). Also suitable are so-called pinned cylinder extruders or Stiftconvert® extruders (manufacturer: Berstorff), such as are used for the manufacture of unvulcanized and vulcanized rubber mixtures. The pins incorporated in the housing serve as abutments in order to prevent the kneaded material rotating together with the shaft. Single-shaft screw kneaders without movement barriers are unsuitable for the aforementioned task.

In order to adjust the residence time accurately and/or to control parallel diffusion-determined reactions, batch units are preferred to continuously operating types of apparatus. Kneader mixers with so-called double-blade sigma stirrers (manufacturer: Fima) in a horizontal assembly are particularly suitable for the aforedescribed task. The blades operate at different speeds and their direction of rotation can be reversed. A discharge screw is arranged in the saddle region for emptying the kneader. A stirred vessel with a vertically arranged mixer shaft is also suitable if suitable flow baffles are mounted on the vessel wall in order to prevent the kneaded mass rotating together with the stirrer shaft, and in this way an intensive mixing action is imparted to the kneaded material (manufacturer: Bayer AG). The stirrer arms are arranged so that, in addition to producing a thorough mixing of the total vessel contents, they also exert a downwardly directed compression effect so that the discharge screw mounted in the floor of the vessel is always fed with material. Also suitable for the batchwise homogenization of cellulose derivatives with water are double-walled mixing vessels with a planetary stirrer and inline homogenizer. The planetary stirrer ensures that the vessel contents are intensively mixed and guarantees an almost encrustation-free cleaning of the temperature controllable inner wall of the vessel. A rotor-stator system connected in a bypass arrangement provides for an additional homogenization.

The feed composition, containing swollen and/or dissolved cellulose derivative, is then converted in step b) into the solid state in a preferably sieve-free high rotational speed gas jet impact mill in such a way that, on the one hand, at least a portion of the water that is present in the feed composition is converted into steam by means of a superheated gas stream mixture. The superheated gas mixture is selected from a steam/inert gas mixture or a steam/air gas mixture, and has a steam content of 40 to 99 wt. %, based on the total weight of the superheated gas mixture. While at least a portion of the water of the feed composition is converted to vapor, the dissolved and/or swollen cellulose derivative of the feed composition is converted into the solid state form of finely particulate particles. In the method of the present invention, the formation of the particulate cellulose derivative takes place under the application of external forces (e.g., impact, shear forces).

The feed composition, containing the cellulose derivative, can be fed into the impact mill by means of feed devices known that are well known to the skilled artisan. The selection of which feed device is used, typically depends on the consistency of the material to be fed, as is known to the skilled artisan. A preliminary comminution of the strand material to be fed into individual strands, which may optionally also be separated in the transverse direction, may be carried out, in which connection the individual strands should preferably have cross-section areas of greater than 1 mm$^2$. The feed material for this purpose is preferably forced through a passing sieve and thereby formed into individual strands. Single-shaft or double-shaft screw mixers with a breaker plate attachment (meat mincer) may be used in a similar way. The endless strands may optionally be cut by means of a cutting tool into smaller sections downstream from the breaker plate. With screw feeding it is possible to feed the extruded strands directly into the grinding zone of the mill.

The mill drying (i.e., step c)) is carried out in a high rotational speed gas jet impact mill, preferably a sieve-free high rotational speed gas jet impact mill, in which the cellulose derivative is subjected to impact and/or shear forces. Such mills are known and are described for example in U.S. Pat. No. 4,747,550, DE-A-3 811 910 or EP-A-0 775 526.

A mixture of steam and an inert gas or air is used as heat exchange gas and carrier gas for the mill drying, the amount of steam preferably being adjusted so that the water used as solvent for the cellulose derivative is evaporated. In a further preferred variant water or steam may additionally be fed into the mill in step b), and may be utilized for example in the start-up process to produce a steam atmosphere in the grinding unit.

Any suitable gases or gas mixtures having a dew point less than room temperature may be used as the inert gas. Nitrogen, carbon dioxide, air, combustion gases or mixtures of these gases are preferably used. The temperature of the inert gas and/or air that is fed in may be chosen arbitrarily, although the temperature is preferably in the range 0°-300° C., and in particular inert gas and/or air is used in the temperature range 5°-50° C., preferably ambient temperature. The gas or gas mixture may be preheated by a heat exchanger, or may already be hot, as is the case with combustion gases. The inert gas and/or air may be added to the grinding unit at any suitable points. Thus for example coarse granular material may be recycled pneumatically to the grinding zone and the throughput may be chosen so that the desired amount of inert gas and/or air is fed. The addition of inert gas or air may take place for example at the suction side of the fan or together with the material to be ground. The addition of the inert gas and/or air may preferably also take place at the same time at various points in the grinding unit. The inert gas or air is added in a ratio relative to the fed vaporized water of 1:99 parts by weight to 60:40 parts by weight, preferably in a ratio of 3:97 parts by weight to 40:60 parts by weight, particularly preferably in a ratio of 5:95 parts by weight to 30:70 parts by weight. The fed water is added via the dissolved and/or swollen cellulose derivative and is evaporated in the mill drying procedure, or is fed directly into the mill in the form of water or steam. The evaporated amount of water is calculated as follows:

amount of steam (kg/h)=amount of water or steam fed in (kg/h)+added amount of gel (kg/h)*wt. % of water in the gel/100 wt. %−throughput MC powder (kg/h)*wt. % moisture/100 wt. %.

Since the last term is generally very small compared to the first and second terms, the amount of steam may be calculated approximately as follows:

amount of steam (kg/h)=amount of water or steam fed in (kg/h)+added amount of gel (kg/h)*wt. % of water in the gel/100 wt. %.

If no additional water or steam is fed into the mill, then the amount of steam is calculated approximately as follows:

amount of steam (kg/h)=added amount of gel (kg/h) *wt. % of water in the gel/100 wt. %.

Since the amount of gas circulating in the system is high relative to the added water and amount of inert gas and/or air, this ensures the thorough mixing of the steam with the inert gas and/or air.

The feed composition, containing dissolved and/or swollen cellulose derivative, is comminuted by multiple impacts and/or shear stress between the rotating and fixed or counter-rotating grinding machinery and/or by the impact of many particles. At the same time the solvent present in the feed composition is vaporized. The thermal energy required for this purpose is supplied only in part by the heat exchange gas. The electrical energy of the mill drive that is converted by friction into heat contributes at the same time to the drying.

The finely particulate solid particles that are obtained, are separated from the gas stream, for example in a separator connected downstream of the mill drying apparatus. The separator may be a gravity force separator, for example a cyclone, or may also be a filter separator. Depending on the design of the mill, a size classification by screening may also be carried out internally. Any oversize material that may be present is separated from the fines as a result of the centrifugal force, which overcomes the drag forces of the carrier gas. The fines are removed as finished material from the grinding chamber together with the carrier gas. The oversize material is recycled in an internal or external oversize material recycle system to the grinding zone. The mill drying is carried out in such a way that no further size classification by screening or sieving is necessary. However, the coarse grain is preferably separated via a protective screening. Screens with a mesh width of 0.125 mm to 1 mm are used for this purpose. The separated coarse grain fraction is <15 wt. %, preferably <7 wt. %, particularly preferably <3 wt. %, based on the total weight of the mill-dried particulate cellulose derivative. This separated coarse fraction may optionally be returned to the mill or added in small amounts to the feed material.

The heat exchange gas and carrier gas (mill gas) is cycled and the excess amount is extracted as a partial steam. The amount of circulating gas (kg/h) in the cycle is preferably in a ratio of 5 to 15, in particular in a ratio of 8 to 12, relative to the added water (kg/h) and amount of inert gas and/or air (kg/h). A heat exchanger is connected in front of the mill drying apparatus, and reheats the mill gas that has cooled as a result of the evaporation of the water contained in the cellulose derivative, and heat losses. The temperature of the steam/inert gas mixture or steam/air mixture used for the mill drying is chosen in such a way so that, depending on the selected product throughput and/or amount of solvent and/or solvent mixture, at no point in the cellulose derivative does the temperature fall below the dew point.

A low-oxygen atmosphere is generated in the mill drying apparatus by using a steam/inert gas mixture or steam/air mixture.

The steam content in the extracted partial stream of mill gas may be condensed with recovery of heat, optionally after a hot gas filtration.

The finely particulate solid particles may optionally be dried to the desired moisture content in step d) in drying devices that are well known to the skilled artisan. The drying is conveniently carried out using convective dryers, preferably with pneumatic dryers, ring dryers or similar equipment. The mill drying is preferably carried out in such a way that a subsequent drying step is not necessary.

In order to modify the property profile of the final product, modifiers, additives and/or active substances may be added before, during or after one or more of the steps of the process according to the invention.

By the term modifiers are understood to be substances that have a chemical effect on the polysaccharide derivative. Typical modifiers are oxidizing agents, for example hydrogen peroxide, ozone, hypohalides, perborates and percarbonates, as well as crosslinking agents, for example dialdehydes such as glyoxal or glutaric acid dialdehyde, polyfunctional epoxides, polyfunctional isocyanates, organic acids, mineral acids, organic and inorganic salts, though the list is not restricted to the above.

By the term additives are understood substances that do not have any chemical effect on the polysaccharide derivative. Typical additives are preservatives, dispersing agents, defoaming agents, air-entraining agents, pigments, non-ionic, anionic and cationic synthetic and natural polymers and their derivatives, for example starch ethers such as hydroxyethyl starch or hydroxypropyl starch, organic and inorganic salts, though the list is not restricted to the above.

By the term active substances are understood to be substances that do not have any chemical effect on the cellulose derivative and that utilize the cellulose derivative as a binder. Typical active substances are plant protection agents and pharmaceuticals, though the list is not restricted to the above.

The cellulose derivatives of this invention may be used in a large number of applications. They may be used for example as water-soluble or solvent-soluble thickening agents or binders in colouring agents, pharmaceuticals, cosmetics or foodstuffs. They may also be used as coating agents, for example in pharmaceuticals. A further use is as a protective colloid, for example in suspension polymerization.

The products of the process of the present invention, are finely particulate cellulose derivatives, the predominant structures originating from the starting materials, e.g. fiber structures, being largely eliminated.

The finely particulate cellulose derivatives produced according to the process of the present invention are optionally analyzed offline by means of laser diffraction processes for the particle size determination (e.g. Sympatec HELOS (H1007)&RODOS). The diffraction pattern is evaluated by first of all assuming that the particles are spherical and have a constant true density over the whole particle size spectrum. In this connection significant differences compared to products that have been produced according to processes of the prior art have surprisingly been found. Thus for example, according to the process of the invention products can be produced with less than 5 wt. %, preferably less than 2 wt. %, based on the total weight, of the particles having a particle size of less than 15 μm. Products can be produced with less than 2 wt. %, preferably less than 1 wt. %, based on the total weight, of the particles smaller than 10 μm, and less than 1 wt. %, preferably less than 0.5 wt. % and most preferably less than 0.1 wt. %, based on the total weight, of the particles smaller than 5 μm. Alternatively the particle-size distribution curve can also be adjusted so that in each case, based on the total weight, 20 wt. % of the particles have a particle size of less than 15 μm, less than 10 wt. % have a particle size of less than 10 μm and less than 2 wt. % have a particle size of less than 5 μm. The result is a substantially reduced proportion of very small fines and a narrower particle size distribution compared to products according to the prior art.

By varying the rotational speed of the rotor and thus the circumferential speed of the rotor of the high rotational speed gas jet rotation impact mill, the degree of comminution and thus the particle-size distribution curve can be selectively adjusted. In order to control the operation of the mill it is therefore expedient to extract a part of the product stream behind the product separator (cyclone, filter separator) and analyze it continuously by means of a process for determining particle size. Alternatively a sampling and measurement system can be integrated directly into a conveyor line. Laser diffraction processes are preferably used for this purpose.

Narrow ranges as regards the desired particle-size distribution curves can be maintained by this procedure. It is thus possible selectively to adjust the degree of grinding, an accuracy of ±5 wt. % being achieved with respect to the cumulative sieving through a 0.063 mm sieve. The particle-size distribution curves that are achieved for the target sizes 40, 50, 60, 70, 80, 90 wt. %<0.063 mm are listed hereinafter.

The analysis sieves correspond to DIN ISO 3310. The clear mesh widths specified hereinbelow correspond to USA-Standard ASTM E11-61 as follows:

| ASTM E 11-61 | |
|---|---|
| 0.25 mm | 60 mesh |
| 0.125 mm | 120 mesh |
| 0.063 | 230 mesh |

| Particle-size distribution curve A | 40% < 0.063 mm wt. % cumulative sieving |
|---|---|
| <0.25 mm | 98.5-100 |
| <0.2 mm | 95-100 |
| <0.16 mm | 89-98 |
| <0.125 mm | 79-92 |
| <0.1 mm | 65-80 |
| <0.063 mm | 35-45 |

| Particle-size distribution curve B | 50% < 0.063 mm wt. % cumulative sieving |
|---|---|
| <0.25 mm | 99-100 |
| <0.2 mm | 98-100 |
| <0.16 mm | 93-99 |
| <0.125 mm | 85-94.5 |
| <0.1 mm | 75-88 |
| <0.063 mm | 45-55 |

| Particle-size distribution curve C | 60% < 0.063 mm wt. % cumulative sieving |
|---|---|
| <0.25 mm | 99-100 |
| <0.2 mm | 98.5-100 |
| <0.16 mm | 95.5-100 |
| <0.125 mm | 89-96.5 |
| <0.1 mm | 81-91.5 |
| <0.063 mm | 55-65 |

-continued

| Particle-size distribution curve D | 70% < 0.063 mm wt. % cumulative sieving |
| --- | --- |
| <0.25 mm | 99.5-100 |
| <0.2 mm | 99.0-100 |
| <0.16 mm | 97.0-100 |
| <0.125 mm | 93-98 |
| <0.1 mm | 86-94.5 |
| <0.063 mm | 65-75 |

| Particle-size distribution curve E | 80% < 0.063 mm wt. % cumulative sieving |
| --- | --- |
| <0.25 mm | 99.9-100 |
| <0.2 mm | 99.5-100 |
| <0.16 mm | 97.5-100 |
| <0.125 mm | 95.5-99.5 |
| <0.1 mm | 91-97 |
| <0.063 mm | 75-85 |

| Particle-size distribution curve F | 90% < 0.063 mm wt. % cumulative sieving |
| --- | --- |
| <0.25 mm | 99.9-100 |
| <0.2 mm | 99.5-100 |
| <0.16 mm | 98.5-100 |
| <0.125 mm | 96.5-99.9 |
| <0.1 mm | 94-99.5 |
| <0.063 mm | 85-95 |

Broader particle size distributions can be obtained by mixing powders of different particle-size distribution curves.

The bulk densities of the finely particulate cellulose derivatives can be adjusted in the process according to the invention from greater than/equal to 0.15 kg/l to greater than/equal to 0.5 kg/l. Preferably finely particulate cellulose derivatives are produced having a bulk density of greater than/equal to 0.3 kg/l and less than/equal to 0.5 kg/l.

EXAMPLES

Feed Composition Preparation

In a stirred vessel with a vertically arranged mixer shaft, on which the mixing implements are arranged so as to cover the whole mixing space, a water-moist filter cake of a methylhydroxyethyl cellulose with a water content of 55 wt. %, based on the total weight (of methylhydroxyethyl cellulose with a DS (methyl)=1.51 and a MS (hydroxyethyl) =0.28) was continuously mixed with water so as to produce a feed composition of methylhydroxyethyl cellulose gel having a solids content of 25%, based on the total weight. In order to prevent the material from rotating together with the mixer shaft, flow baffles are arranged on the vessel wall. The stirrer blades are arranged on the mixer shaft so that they, together with the thorough mixing, also exert a downwardly directed compression effect so that the discharge screw mounted in the floor of the vessel is constantly fed with material. The feed composition, in the form of a gel, was collected and then processed further into finely particulate methylhydroxyethyl cellulose products (Examples MT 1-3).

Examples: Mill Drying (MT)

The grinding unit consists of a sieve-free high rotational speed gas jet rotary mill (type Ultra Rotor II, Altenburger Maschinen Jäckering GmbH) with a vertically arranged drive shaft and seven grinding tracks of 0.5 mm diameter with in each case 16 impact plates that operate against a profiled counter-grinding track. The circumferential speed of the rotor is determined by the rotational speed of the rotor and is calculated according to the formula $U=\pi*n*d$ where n=rotational speed of the rotor and d=0.5m. The rotational speed of the rotor is regulated via the mill control system. A cyclone of 0.6 m diameter, where the main portion of the finely ground product is separated, as well as two bag filters connected in parallel and each of size 12 $m^2$, are connected downstream of the mill. After the cyclone a radial fan forces the mill gas into the mill again via a hot gas generator equipped with a natural gas burner.

The feed composition (water-moist cellulose derivative) is metered by means of a metering screw into the mill to the height of the first and second grinding tracks. The feed composition is cut into individual strands of ca. 10 mm diameter by means of a perforated plate connected in front of the metering screw. A fixed amount of nitrogen is also metered in at various points (fan, impact mill, cyclone) of the apparatus.

The excess steam/nitrogen is extracted and the steam fraction is precipitated in a water jet fan.

Example: MT1

A methylhydroxyethyl cellulose gel (of methylhydroxyethyl cellulose with a DS (methyl)=1.51 and a MS (hydroxyethyl)=0.28) with a solids content of 25%, based on the total weight, was ground and dried according to the aforedescribed procedure with a throughput of 114 kg per hour. The incoming steam/nitrogen mixture was at a temperature of 230° to 250° C. at normal pressure. After the grinding chamber the temperature of the steam/nitrogen mixture was 130° C. The amount of circulating gas was 1800 cubic meters (measured at 125° C.) per hour. The proportion of steam in the steam/nitrogen mixture was 73 wt. %.

At a rotational speed of the rotor of the impact mill of 3550 $s^{-1}$, a finely particulate MHEC was obtained having a bulk density of 403 g/l and a viscosity, measured as a 2% aqueous solution, of 87,500 mPa*s at 20° C. and 2.55 1/s (Haake Rotovisko). The powder obtained passes in an amount of 75.6 wt. % through a 0.063 mm sieve. The particle size determination by means of laser diffraction gave the following values: 4.7 wt. %<15.5 µm; 2.1 wt. %<11 µm and 0.7 wt. %<5.5 µm. The product moisture content is <2 wt. %, based on the total weight.

Example: MT2

The same MHEC gel was ground and dried according to the aforedescribed procedure at a throughput of 106 kg per hour. The incoming steam/nitrogen mixture was at a temperature of 230° to 245° C. at normal pressure. After the grinding chamber the temperature of the steam was 130° C. The amount of circulating gas was 1800 cubic meters (measured at 125° C.) per hour. The proportion of steam in the steam/nitrogen mixture was 71 wt. %.

At a rotational speed of the rotor of the impact mill of 3175 $s^{-1}$, a finely particulate MHEC was obtained having a bulk density of 397 g/l and a viscosity, measured as a 2% aqueous solution, of 90,200 mPa*s at 20° C. and 2.55 1/s (Haake Rotovisko). The powder obtained passes in an amount of 66.1 wt. % through a 0.063 mm sieve. The particle size determination by means of laser diffraction gave the following values: 2.3 wt. %<15.5 µm; 0.9 wt. %<11 µm and 0.0 wt. %<5.5 µm. The product moisture content is <2 wt. %, based on the total weight.

Example

MT3

The same MHEC gel was ground and dried according to the aforedescribed procedure at a throughput of 130 kg per hour. The incoming steam/nitrogen mixture was at a temperature of 250° to 270° C. at normal pressure. After the grinding chamber the temperature of the steam was 130° C. The amount of circulating gas was 1700 cubic meters (measured at 125° C.) per hour. The proportion of steam in the steam/nitrogen mixture was 75 wt. %.

At a rotational speed of the rotor of the impact mill of 2470 $s^{-1}$, a finely particulate MHEC was obtained having a bulk density of 395 g/l and a viscosity, measured as a 2% aqueous solution, of 93,700 mPa*s at 20° C. and 2.55 l/s (Haake Rotovisko). The powder obtained passes in an amount of 55.9 wt. % through a 0.063 mm sieve. The particle size determination by means of laser diffraction gave the following values: 1.7 wt. %<15.5 μm; 0.6 wt. %<11 μm and 0.0 wt. %<5.5 μm. The product moisture content is <2 wt. %, based on the total weight.

The viscosity of the products, measured as a 2% aqueous solution at 20° C. and 2.55 l/s (Haake Rotovisko) in [mPa*s] is abbreviated in the following tables as V2. In the sieve analyses the cumulative sievings are given in wt. %. The laser diffraction values are also given in wt. %. In the following Examples MT 4-16, the cellulose derivative was a methylhydroxyethyl cellulose gel having DS (M), MS (HE) and MS (HP) values as indicated in the following tables.

Examples MT 4-6

| | Example | | |
|---|---|---|---|
| | 4 | 5 | 6 |
| DS (M) | 1.53 | 1.53 | 1.53 |
| MS (HE) | 0.28 | 0.28 | 0.28 |
| MS (HP) | 0.29 | 0.29 | 0.29 |
| Solids content gel, [%] | 25 | 25 | 25 |
| Throughput gel, [kg/h] | 107 | 115 | 112 |
| Rotational speed of rotor, [l/s] | 3550 | 3175 | 2820 |
| T in front of mill, [° C.] | 210-230 | 220-240 | 230-250 |
| T after mill, [° C.] | 130 | 130 | 130 |
| Amount of circulating gas at 125° C. [m³/h] | 1750 | 1700 | 1700 |
| Proportion of water in the steam/nitrogen mixture, [wt. %] | 71 | 73 | 72 |
| Sieve analysis | | | |
| <0.25 mm | 99.9 | 99.7 | 98.6 |
| <0.2 mm | 99.7 | 99.2 | 95.2 |
| <0.16 mm | 99.3 | 96.8 | 89.6 |
| <0.125 mm | 96.8 | 91.0 | 79.1 |
| <0.1 mm | 91.9 | 81.2 | 65.6 |
| <0.063 mm | 71.8 | 55.1 | 37.9 |
| V2 | 8200 | 8200 | 8000 |
| Product moisture content, [wt. %] | 1.7 | 1.3 | 2.0 |
| Bulk density, [g/l] | 408 | 393 | 341 |
| Laser diffraction values | | | |
| <15.5 μm | 4.5 | 2.0 | 1.0 |
| <11 μm | 2.0 | 0.8 | 0.4 |
| <5.5 μm | 0.6 | 0.1 | 0.0 |

Examples MT 7-8

| | Example | |
|---|---|---|
| | 7 | 8 |
| DS (M) | 1.54 | 1.54 |
| MS (HE) | 0.1 | 0.1 |
| MS (HP) | 0.24 | 0.24 |
| Solids content gel, [%] | 22 | 22 |
| Throughput gel, [kg/h] | 142 | 140 |
| Rotational speed of rotor, [l/s] | 3550 | 2470 |
| T in front of mill, [° C.] | 250-270 | 270-290 |
| T after mill, [° C.] | 130 | 130 |
| Amount of circulating gas at 125° C. [m³/h] | 1750 | 1650 |
| Proportion of water in the steam/nitrogen mixture, [wt. %] | 78 | 77 |
| Sieve analysis | | |
| <0.25 mm | 99.9 | 99.6 |
| <0.2 mm | 99.8 | 99.1 |
| <0.16 mm | 99.5 | 96.9 |
| <0.125 mm | 98.0 | 89.8 |
| <0.1 mm | 94.4 | 79.8 |
| <0.063 mm | 78.8 | 49.9 |
| V2 | 49800 | 51000 |
| Product moisture content, [wt. %] | 1.8 | 1.5 |
| Bulk density, [g/l] | 409 | 414 |

Examples MT 9-12

| | Example | | | |
|---|---|---|---|---|
| | 9 | 10 | 11 | 12 |
| DS (M) | 1.56 | 1.56 | 1.56 | 1.56 |
| MS (HE) | 0.27 | 0.27 | 0.27 | 0.27 |
| Solids content gel, [%] | 25 | 25 | 25 | 25 |
| Throughput gel, [kg/h] | 117 | 114 | 113 | 120 |
| Rotational speed of rotor, [l/s] | 3550 | 3175 | 2820 | 2470 |
| T in front of mill, [° C.] | 240-250 | 230-250 | 240-260 | 250-270 |
| T after mill, [° C.] | 130 | 130 | 130 | 130 |
| Amount of circulating gas at 125° C. [m³/h] | 1800 | 1800 | 1750 | 1750 |
| Proportion of water in the steam/nitrogen mixture, [wt. %] | 73 | 73 | 73 | 74 |
| Sieve analysis | | | | |
| <0.25 mm | 100.0 | 99.9 | 99.9 | 99.7 |
| <0.2 mm | 99.9 | 99.8 | 99.4 | 98.8 |
| <0.16 mm | 99.8 | 99.1 | 97.4 | 95.2 |
| <0.125 mm | 99.1 | 95.5 | 92.0 | 88.1 |
| <0.1 mm | 95.9 | 89.5 | 83.7 | 78.8 |
| <0.063 mm | 80.9 | 68.2 | 58.7 | 52.0 |
| V2 | 37100 | 39500 | 39600 | 39800 |
| Product moisture content, [wt. %] | 1.5 | 1.7 | 1.6 | 1.3 |
| Bulk density, [g/l] | 431 | 424 | 414 | 414 |
| Laser diffraction values | | | | |
| <15.5 μm | 3.4 | 2.2 | 1.2 | 1.0 |
| <11 μm | 1.2 | 0.8 | 0.4 | 0.3 |
| <5.5 μm | 0.0 | 0.0 | 0.0 | 0.0 |

Comparative Examples

The same MHEC as in Examples 10-13 was, after separation from the wash solution, first of all processed into an oversize product and was then ground in a vibratory mill. Products having the following product parameters were obtained:

| Sieve analysis | | |
|---|---|---|
| <0.25 mm | 100.0 | 100.0 |
| <0.2 mm | 100.0 | 100.0 |
| <0.16 mm | 100.0 | 100.0 |
| <0.125 mm | 92.7 | 93.9 |
| <0.1 mm | 80.9 | 83.5 |
| <0.063 mm | 53.0 | 54.9 |
| V2 | 35900 | 34500 |
| Product moisture content, [wt. %] | 2.3 | 2.3 |
| Bulk density, [g/l] | 382 | 376 |
| Laser diffraction values | | |
| <15.5 µm | 5.4 | 7.8 |
| <11 µm | 4.1 | 6.0 |
| <5.5 µm | 2.9 | 3.9 |

Examples MT 13-16

| | Example | | | |
|---|---|---|---|---|
| | 13 | 14 | 15 | 16 |
| DS (M) | 1.45 | 1.45 | 1.45 | 1.45 |
| MS (HE) | 0.21 | 0.21 | 0.21 | 0.21 |
| Solids content gel, [%] | 22.5 | 26 | 26 | 30 |
| Throughput gel, [kg/h] | 53 | 103 | 107 | 110 |
| Rotational speed of rotor, [l/s] | 4420 | 4420 | 3540 | 4420 |
| T in front of mill, [° C.] | 150-160 | 180-200 | 210-230 | 190-200 |
| T after mill, [° C.] | 120 | 120 | 120 | 120 |
| Amount of circulating gas at 115° C. [m³/h] | 1850 | 1850 | 1800 | 1850 |
| Proportion of water in the steam/nitrogen mixture, [wt. %] | 56 | 70 | 71 | 71 |
| Sieve analysis | | | | |
| <0.25 mm | 100.0 | 100.0 | 100.0 | 100.0 |
| <0.2 mm | 99.9 | 99.9 | 100.0 | 100.0 |
| <0.16 mm | 99.8 | 99.9 | 99.9 | 100.0 |
| <0.125 mm | 98.9 | 99.8 | 99.6 | 99.8 |
| <0.1 mm | 96.8 | 98.8 | 98.1 | 98.0 |
| <0.063 mm | 86.6 | 92.9 | 88.1 | 85.9 |
| V2 | 13300 | 15000 | 15900 | 16100 |
| Product moisture content, [wt. %] | 1.4 | 2.1 | 1.6 | 2.1 |
| Bulk density, [g/l] | 360 | 324 | 334 | 247 |
| Laser diffraction values | | | | |
| <15.5 µm | 8.9 | 19.1 | 9.6 | 10.7 |
| <11 µm | 3.9 | 8.8 | 4.4 | 5.3 |
| <5.5 µm | 0.6 | 0.5 | 0.9 | 1.0 |

For test purposes the mill drying plant underwent twelve start-up and shut-down operations for a total running time of 30 hours, corresponding to the procedure described in Examples MT 1-16. No condensation of steam or caking were observed in the mill drying plant.

For comparison purposes the mill drying plant was operated with steam without any nitrogen. In this case however condensation of steam, caking of ground material in the mill as well as caking on the rotary vane feeders were observed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing particulate water-soluble cellulose derivatives, comprising:
    a) forming a feed composition comprising a cellulose derivative, and 50 wt. % to 80 wt. % of water, based on the total weight of the feed composition, wherein the cellulose derivative is at least one of swelled and dissolved in the feed composition;
    b) contacting, in a high rotational speed gas jet impact mill, the feed composition with a superheated gas mixture selected from (i) a superheated gaseous mixture of steam and an inert gas, and (ii) a superheated gas mixture of steam and air, thereby converting the cellulose derivative of the feed composition into a solid state form of finely particulate particles, wherein the superheated gas mixture has a steam content of 40 wt. % to 99 wt. %, based on the total weight of the superheated gas mixture;
    c) separating the particulate cellulose derivative from the superheated gas mixture; and
    d) optionally drying the particulate cellulose derivative.

2. The process of claim 1 wherein the cellulose derivative is present in said feed composition in an amount of 20 wt. % to 50 wt. %, based on the total weight of the feed composition.

3. The process of claim 1 wherein at least one of modifiers, additives and active substances are mixed with or added to the cellulose derivative before, during or after one or more of the partial steps a) to c) of the process.

4. The process of claim 1 wherein that the cellulose derivative is a cellulose derivative having a thermal flocculation point.

5. The process of claim 1 wherein the cellulose derivative used to form the feed composition is in the form of a water-moist filter cake, and the water used to form the feed composition has a temperature of from 0° to 60° C.

6. The process of claim 1 wherein the cellulose derivative is a cellulose ether.

7. The process of claim 1 wherein a sieve-free high rotational speed gas jet impact mill is used in step b).

8. The process of claim 1 wherein the particle-size distribution curve of the finely particulate cellulose derivative is adjusted in step b) by varying the rotational speed of the high rotational speed gas jet impact mill.

* * * * *